United States Patent
Cariffe

[19]

[11] Patent Number: 6,166,719
[45] Date of Patent: Dec. 26, 2000

[54] CONSISTENTLY ORDERED ADJUSTMENT OF A DIGITALLY REPRESENTED IMAGE

[75] Inventor: Alan Eddy Cariffe, San Diego, Calif.

[73] Assignee: Hewlett-Packard Company, Palo Alto, Calif.

[21] Appl. No.: 09/059,074

[22] Filed: Apr. 9, 1998

[51] Int. Cl.[7] .................................................. G09G 5/10
[52] U.S. Cl. ...................... 345/147; 345/115; 345/127; 345/3; 345/42; 358/1.8; 358/1.9
[58] Field of Search .................................. 345/115, 145, 345/146, 147, 127, 342; 382/274, 309; 358/1.9, 1.8; 707/526, 500, 530, 2

[56] References Cited

U.S. PATENT DOCUMENTS

| | | | |
|---|---|---|---|
| 5,424,754 | 6/1995 | Bar et al. . | |
| 5,548,700 | 8/1996 | Bagley | 358/14.9 |
| 5,550,937 | 8/1996 | Bell | 382/293 |
| 5,739,928 | 4/1998 | Scott | 358/520 |
| 5,740,267 | 4/1998 | Echerer | 382/132 |
| 5,841,512 | 11/1998 | Goodhill | 352/56 |
| 5,898,436 | 4/1999 | Stewart et al. . | |
| 5,926,617 | 7/1999 | Ohara | 358/1.9 |
| 6,011,906 | 1/2000 | Muroki | 358/1.9 |

FOREIGN PATENT DOCUMENTS 0 536 893 A2   9/1992   European Pat. Off. .

OTHER PUBLICATIONS

*PaperPort Strobe 5.0 Software for Macintosh® Getting Started Guide*, available from Visioneer, Inc., 34800 Campus Drive, Fremont, CA 94555, 1997, pp. 12–14.

PaperPort 5.0 software for Macintosh, getting started guide, pp. 12–14.

*Primary Examiner*—Mark R. Powell
*Assistant Examiner*—Wesner Sajous

[57] ABSTRACT

Adjustments are made to a represented image. The represented image is copied to a base image. The base image is copied to produce a second image. The second image is displayed. when a user adjusts a first adjustment control from a plurality of adjustment controls, the base image is copied to the second image, the second image is varied in accordance with current values for each of the plurality of adjustment controls and the second image, as varied, is displayed. The current values for each of the plurality of adjustment controls are applied to the second image in accordance with a predetermined sequence. Likewise, when the user adjusts a second adjustment control from a plurality of adjustment controls, the base image is copied to the second image, the second image is varied in accordance with current values for each of the plurality of adjustment controls and the second image, as varied, is displayed. The current values for each of the plurality of adjustment controls are applied to the second image in accordance with a predetermined sequence. Upon an accepting terminator, the plurality of adjustments are applied to the represented image in accordance with the same predetermined sequence.

22 Claims, 6 Drawing Sheets

CONSISTENTLY ORDERED ADJUSTMENT
OF A DIGITALLY REPRESENTED IMAGE

BACKGROUND

The present invention concerns editing images and pertains specifically to order dependent adjustments applied to a digitally represented image so that a consistent and predictable result ensues with strict provision for digital information losses.

When an adjustment is applied to a digitally represented image, information contained in digital representation may be lost. For example, one operation might be to reduce the brightness. When brightness is adjusted, the internal values for brightness are lowered for each pixel. Internally, pixels are represented by numerical values that are whole numbers. Typically, fractional information is not saved when whole number representations are changed. This means that ratios of the brightness values between any two pixels will usually change as a result of an adjustment in brightness. This represents a non-recoverable loss of information.

In the digital domain, the operation "reduce brightness by the fraction (x/y)" results in pixels whose resulting brightness components are fractions being rounded to whole digits. Likewise, in the digital domain, the operation "increase brightness by the fraction (y/x)" can result in pixels whose resulting brightness components are fractions being rounded to whole digits. Thus in the digital domain, performing the operation "reduce brightness by the fraction (x/y)" followed by the operation "increase brightness by the fraction (y/x)" results in a loss of information. Performing these operations in sequential order in the digital domain can thus result in a loss of information, while performing the same operation in an analog or continuous domain could result in significantly less loss of information.

For example, suppose that a given pixel had an initial brightness value of 126, and that x equals 3 and y equals 10. The ratio (x/y) is then equal to 0.30. The operation "reduce brightness by the fraction (x/y)" results in the brightness value of 37.8 in the analog domain, but 38 in the digital or whole number domain, with rounding to the nearest integer. Trying to reverse this operation by increasing the brightness to y/x (10/3) or 3.3333, results in a new brightness value of 38*10/3=126.666 or 127 when rounded up in the digital domain. Thus in the digital domain, these two sequential operations result in an error of 1 unit of brightness. Because of the lost information, digital operations, even though theoretically reversible, can result in lost information and incorrect results.

Further, if after adjusting the brightness in the digital domain, additional adjustments are made, such as changing the contrast or changing the dynamic range of the pixels, to the image representation, whichever adjustment is performed first affects the errors on subsequent adjustments. The results will be different for different sequential orderings of the adjustments on the digitally represented image.

SUMMARY OF THE INVENTION

In accordance with the preferred embodiment of the present invention, adjustments are made to a represented image. A base image is copied to produce a second image. The second image is displayed. When a user adjusts a first adjustment control from a plurality of adjustment controls, the base image is copied to the second image, the second image is varied in accordance with current values for each of the plurality of adjustment controls and the second image, as varied, is displayed. The current values for each of the plurality of adjustment controls are applied to the second image in accordance with a predetermined sequence. Likewise, when the user adjusts a second adjustment control from a plurality of adjustment controls, the base image is copied to the second image, the second image is varied in accordance with current values for each of the plurality of adjustment controls and the second image, as varied, is displayed. The current values for each of the plurality of adjustment controls are applied to the second image in accordance with a predetermined sequence.

For example, the first adjustment control is a contrast control and the second adjustment control is a brightness control.

In the preferred embodiment, an original image is copied to produce the base image. Upon an acceptance terminator (i.e., the user indicating OK), the original image is varied in accordance with current values for each of the plurality of adjustment controls and the original image is displayed as varied. The current values for each of the plurality of adjustment controls are applied to the original image in accordance with the predetermined sequence. Additionally, upon the user indicating cancel, the original image is displayed.

Also in the preferred embodiment, upon the user indicating revert, the base image is copied to the second image. Each of the plurality of adjustment controls is reset to initial values.

The present invention provides for an efficient way to vary control values for an image. Because the same predetermined sequence of operations is always applied to a copy of the base image, any information loss caused by applying image modifying adjustments will always be the same as when applying the same sequence of adjustments to the base image. Also, the information losses will not be cumulative during any arbitrary sequences of user adjustments.

DESCRIPTION OF THE PREFERRED EMBODIMENT

Figure 1:
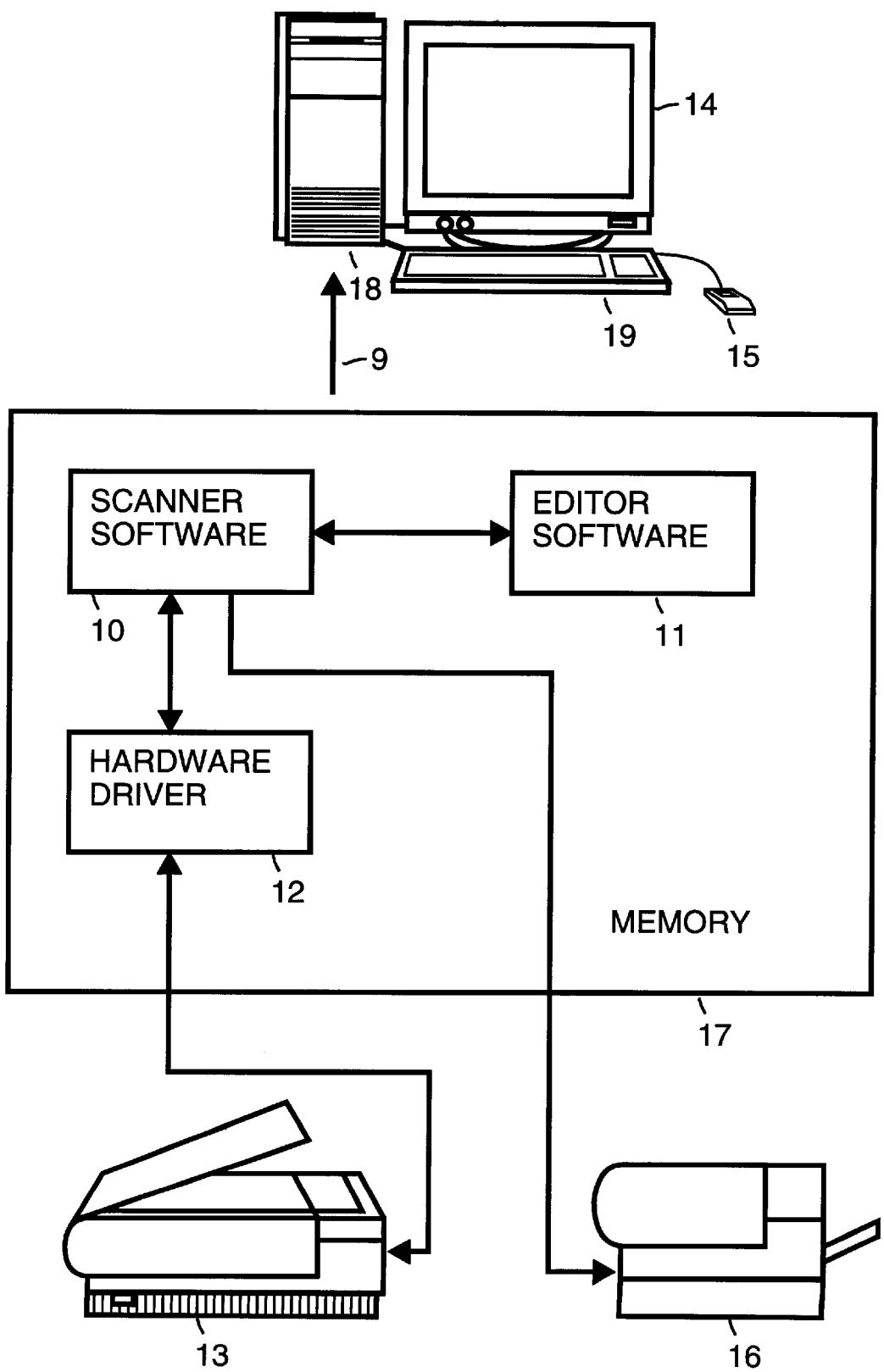
FIG. 1 is a block diagram of a scanner system used to generate a digitally represented image.

FIG. 1 shows a block diagram of a scanner system which may be used to produce digitally represented images. A computer 18 is shown connected to monitor 14. Also connected to computer 18 is a keyboard 19 and a mouse 15.

Scanner software 10 interacts with a hardware driver 12 to cause scanner hardware 13 to scan a picture placed upon scanner 13. Upon successful retrieval of an image of a picture, the image is displayed upon a monitor 14 for view by a user. A user may then modify the image using editor software 11 and/or print out the image using a printer 16. Scanner software 10, hardware driver 12 and editor software 11 all reside within a system memory 17, as shown by FIG. 1. As demonstrated by arrow 9, memory 17 resides in computer 18.

While FIG. 1 illustrates one way for obtaining a digitally represented image, other means may be used to obtain digitally represented images. For example, digitally represented images may be generated by a drawing program, captured by a digital camera, or retrieved from a library of such images.

Figure 2:
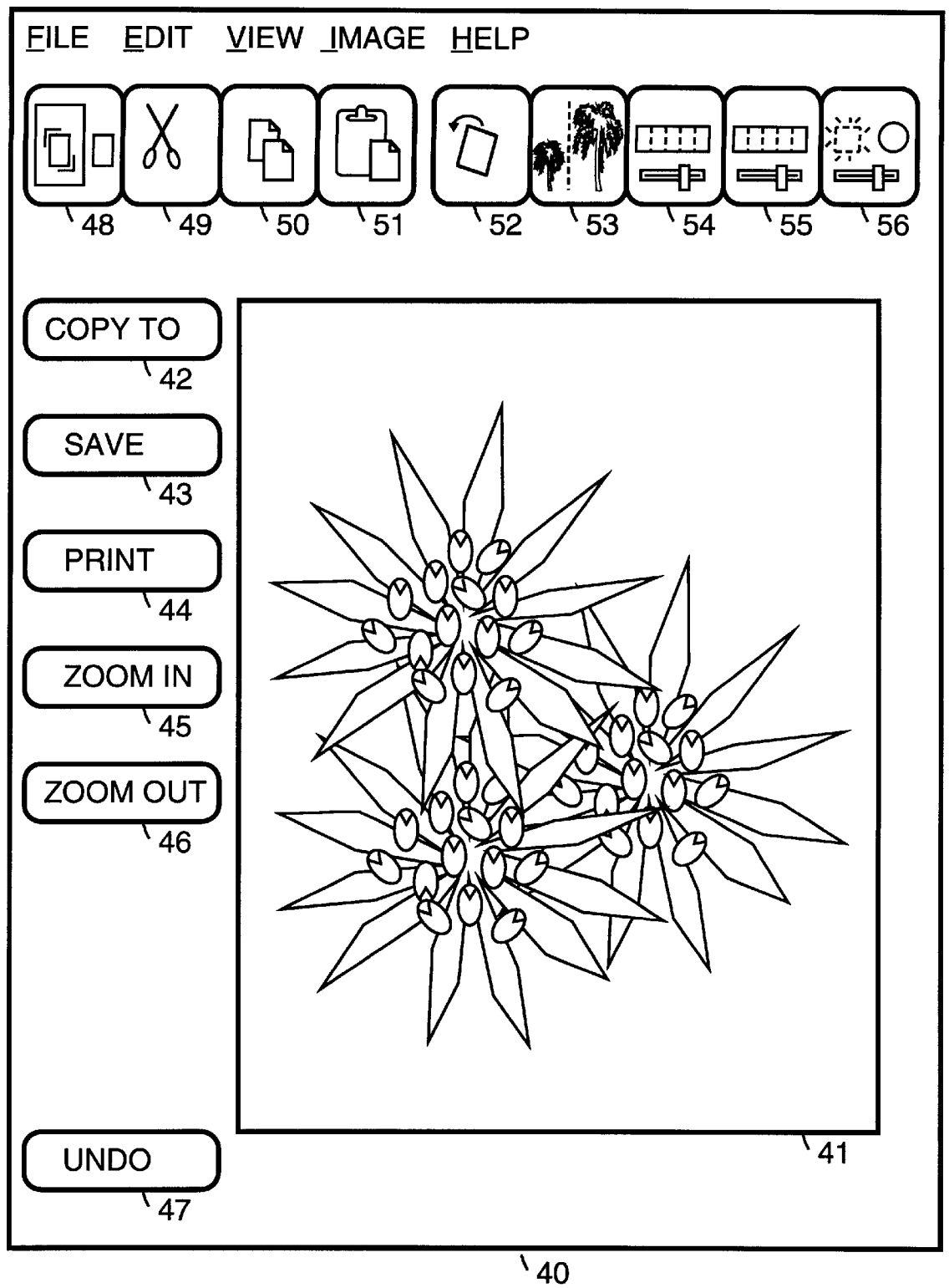
FIG. 2 shows a user interface to an image editor in accordance with a preferred embodiment of the present invention.

Editor software 11 allows a digitally represented image to be edited. For example, FIG. 2 shows a user interface for editor software 11. In an editing interface window 40, a digitally represented image 41 is displayed. A user selects a button 42 to copy digitally represented image 41 to another file or application program. A user selects a button 43 to save digitally represented image 41 to the current file. A user selects a button 44 to print digitally represented image 41. A user selects a button 45 to zoom in on a portion of digitally represented image 41. A user selects a button 46 to zoom out on digitally represented image 41. A user selects a button 47 to undo any changes made to digitally represented image 41. A user selects a button 48 to crop digitally represented image 41. A user selects a button 49 to cut all or a portion of digitally represented image 41. A user selects a button 50 to make a copy of all or a portion of digitally represented image 41. A user selects a button 51 to place all or a portion of digitally represented image 41 on a system clip board. A user selects a button 52 to rotate all or a position of digitally represented image 41. A user selects a button 53 to adjust the size of digitally represented image 41. A user selects a button 54 to adjust the colors or hue of digitally represented image 41. A user selects a button 55 to adjust the brightness and contrast of digitally represented image 41. A user selects a button 56 to adjust the sharpness of digitally represented image 41.

Figure 3:
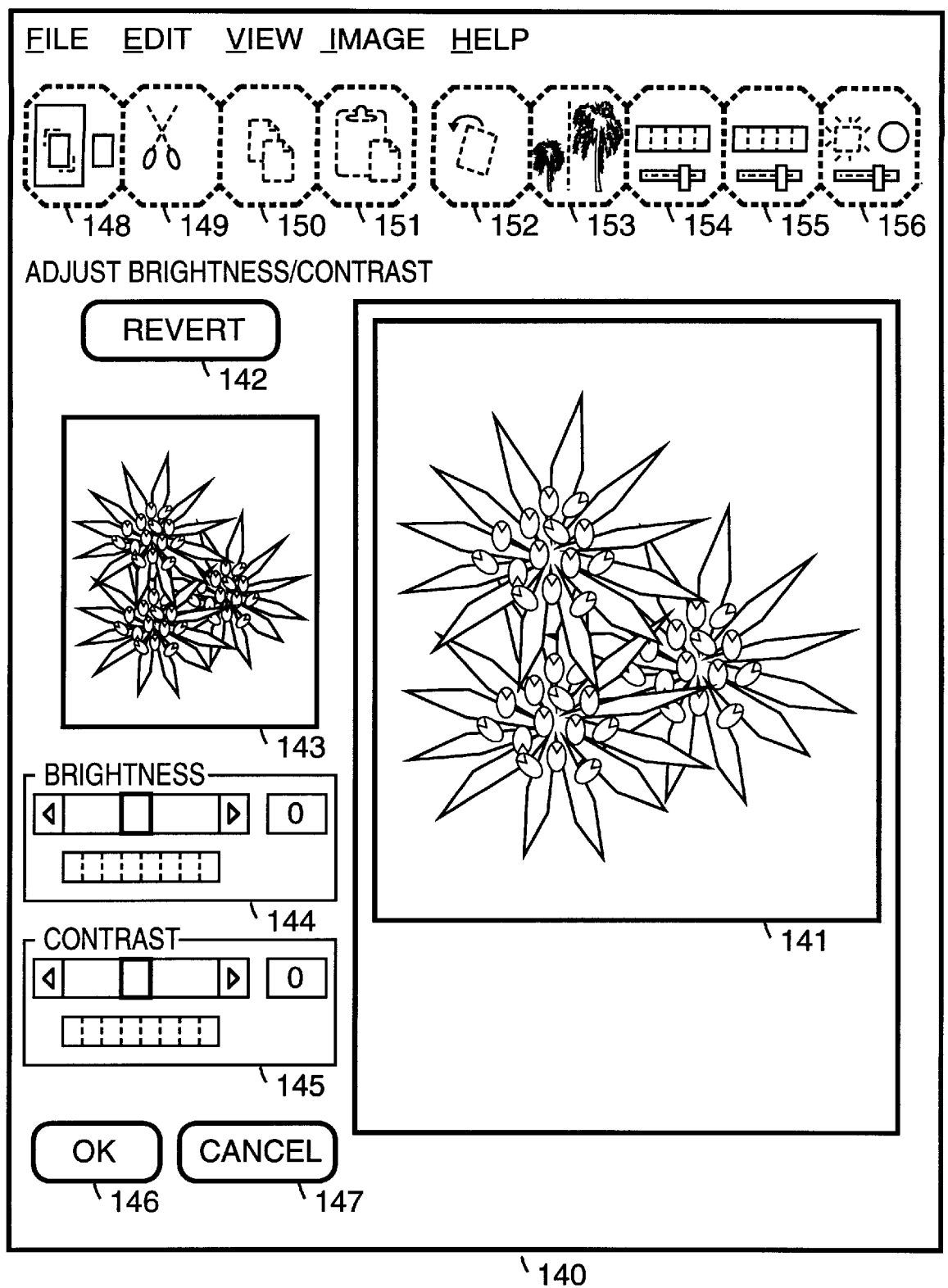
FIG. 3 shows a user interface to brightness/contrast controls for an image editor in accordance with a preferred embodiment of the present invention.

When the user selects button 55, an adjust brightness/contrast interface 140 is displayed to a user, as shown in FIG. 3. In brightness/contrast interface 140, a button 148 is displayed which is a grayed out version of button 48. Button 148 is grayed out to indicate that the functionality represented is not available. A button 149 is displayed which is a grayed out version of button 49. Button 149 is grayed out to indicate that the functionality represented is not available. A button 150 is displayed which is a grayed out version of button 50. Button 150 is grayed out to indicate that the functionality represented is not available. A button 151 is displayed which is a grayed out version of button 51. Button 151 is grayed out to indicate that the functionality represented is not available. A button 152 is displayed which is a grayed out version of button 52. Button 152 is grayed out to indicate that the functionality represented is not available. A button 153 is displayed which is a grayed out version of button 53. Button 153 is grayed out to indicate that the functionality represented is not available. A button 154 is displayed which is a grayed out version of button 54. Button 154 is grayed out to indicate that the functionality represented is not available. A button 155 is displayed which is a grayed out version of button 55. Button 155 is grayed out to indicate that the functionality represented is not available. A button 156 is displayed which is a grayed out version of button 56. Button 156 is grayed out to indicate that the functionality represented is not available.

An image 141 is the equivalent of digitally represented image 41 (shown in FIG. 2). An adjustable image (or thumbnail sketch) 143 of image 141 is also shown. A user adjusts the brightness of adjustable image 143 using brightness control 144. The brightness value displayed by brightness control 144 is a relative offset from the current, absolute value for image 141. Thus for example, if the current, absolute values of brightness for image 141 is "100", a reading of "20" in brightness control 144 would be the equivalent of an absolute value of 120.

A user adjusts the contrast of adjustable image 143 using contrast control 145. The contrast value displayed by contrast control 145 is a relative offset from the current, absolute value of contrast for image 141. Thus for example, if the current, absolute value of contrast for image 141 is "100", a reading of "20" in contrast control 145 would be the equivalent of an absolute value of 120.

A user selects a REVERT button 142 to revert changes made to adjustable image 143 back to values represented by image 141. A user selects an OK button 146 (i.e., activates an acceptance terminator) to return to editing interface window 40 (shown in FIG. 2) with displayed image 41 having the brightness and contrast values represented by modified adjustable image 143 and using the values of the control adjustments in window 140 present when OK button 146 was pressed. A user selects a CANCEL button 147 to return to editing interface window 40 (shown in FIG. 2) with the displayed image having the brightness and contrast values represented by image 141 (i.e., digitally represented image 41 is displayed unchanged).

Figure 4:
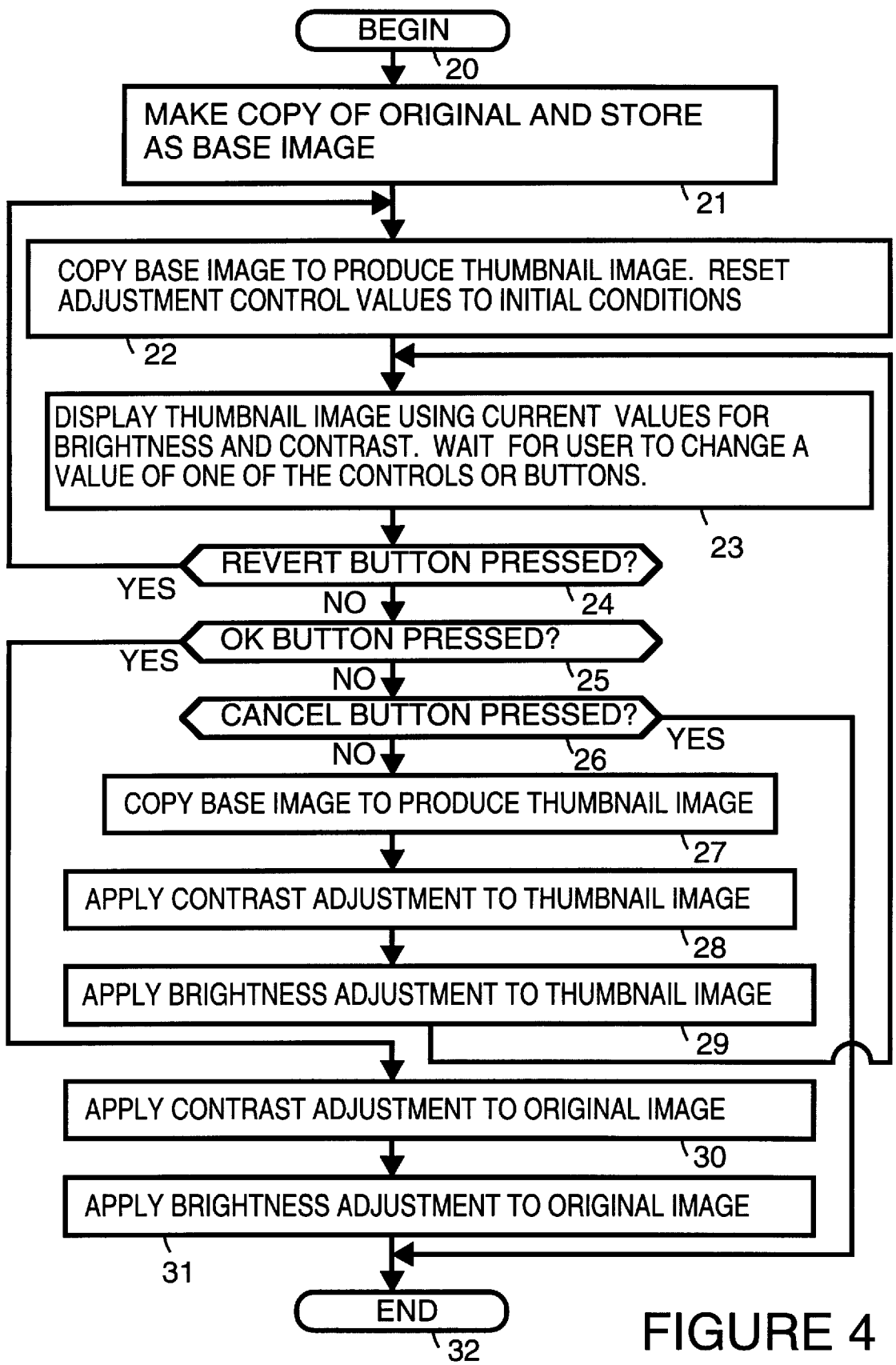
FIG. 4 is a flowchart which represents making adjustments to a digitally represented image in accordance with a preferred embodiment of the present invention.

FIG. 4 is a flowchart which implements the adjust brightness/contrast interface shown in FIG. 3. The implementation allows a user to preview multiple trial changes to the image. Changes to brightness and contrast are initially made to modified adjustable image 143 and can be evaluated by a user prior to applying changes to image 141 (and subsequently to image 41). The "trial" changes may be made by the user independently, in any order, and perhaps multiple times prior to being applied to image 141.

The present invention limits information loss from making adjustments to modified adjustable image 143. In the absence of this feature, frequent changes to modified adjustable image 143 could result in significant information loss. An extreme example of this is if a user were to reduce the brightness to zero, and then try to increase it to its previous value. Because there is no information whatsoever in an image consisting of zero brightness pixels, the entire image information would be irretrievably been lost.

In a step 20 (FIG. 4), the user has selected button 55 in editing interface window 40 (shown in FIG. 2) to display brightness/contrast interface 140 (shown in FIG. 3).

In a step 21, a copy of digitally represented image 41 (shown in FIG. 2) is copied to produce a base image 141. For example base image 141 is a smaller size than original image 41 (or alternatively can be the same size or even larger), and depending on the implementation, can be a thumbnail sketch of original image 41.

In a step 22, a copy of base image 141 is made to produce a modified adjustable image 143 which is to be displayed, for example, as a thumbnail image (shown in FIG. 3). For example, modified adjustable image 143 is smaller than original image 41. In step 22, all adjustment control values are set to their initial conditions. For example, this means that values for both brightness and contrast are set to their initial 0 relative values (as shown in FIG. 3).

In a step 23, the adjustable image 143 is displayed to the user using the current values for brightness and contrast, and the brightness/contrast interface waits for the user to change any control or button made available to the user. For example, FIG. 3 shows that controls are available for adjusting relative brightness using brightness control 144, adjusting relative contrast using contrast control 145, selecting REVERT button 142, selecting OK button 146 or selecting CANCEL button 147.

In a step 24, if REVERT button 142 is selected, the brightness/contrast interface returns to step 22. In step 24, if REVERT button 142 is not selected, the brightness/contrast interface continues to a step 25.

In step 25, if OK button 146 is selected, the brightness/contrast interface jumps ahead to a step 30. In step 25, if OK button 146 is not selected, the brightness/contrast interface continues to a step 26.

In step 26, if CANCEL button 147 is selected, the brightness/contrast interface jumps ahead to a step 32. In step 26, if CANCEL button 147 is not selected, the brightness/contrast interface continues to a step 27.

In step 27, a base image 141 (shown in FIG. 3) is copied to modified adjustable image 143.

In a step 28, the current value for contrast control 145 is read and the value is applied to modified adjustable image 143.

In a step 29, the current value for brightness control 144 is read and the value is applied to modified adjustable image 143. After completing step 29, the brightness/contrast interface returns to step 23.

Figure 5:
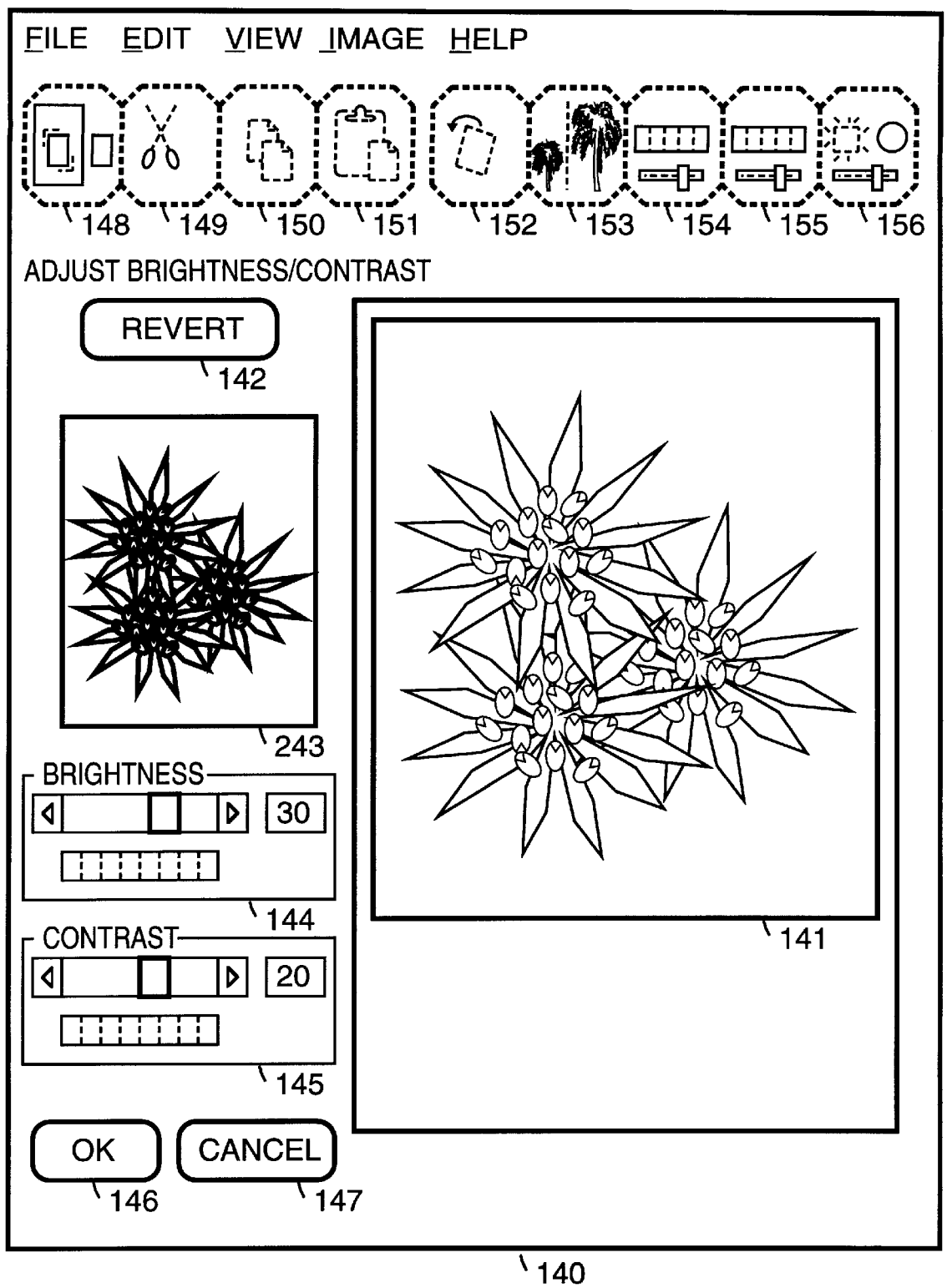
FIG. 5 shows the user interface to brightness/contrast controls for an image editor as shown in FIG. 3 with a modified adjustable image or thumbnail sketch of a displayed image in accordance with a preferred embodiment of the present invention.

In step 23, the resulting thumbnail image is displayed to the user. For example, FIG. 5 shows contrast control 145 currently at the value "20". FIG. 5 shows brightness control 144 currently at the value "30". A resulting changed or adjusted image 243 reflects the current values of contrast control 145 and brightness control 144.

In step 30, the current relative adjustment contrast value is read from contrast control 145 and the current relative adjustment contrast value is applied as an increment to the original image (i.e., digitally represented image 41 shown in FIG. 2).

In step 31, the current relative adjustment brightness value is read from brightness control 144 and the current relative adjustment brightness value is applied as an increment to the original image as it was modified in step 30. The resulting image is used as the new digitally represented image or a new desired base image.

In a step 32, the brightness/contrast interface is closed and editing interface window 40 is reopened. The new digitally represented image (with the new values for contrast and brightness) is displayed.

Figure 6:
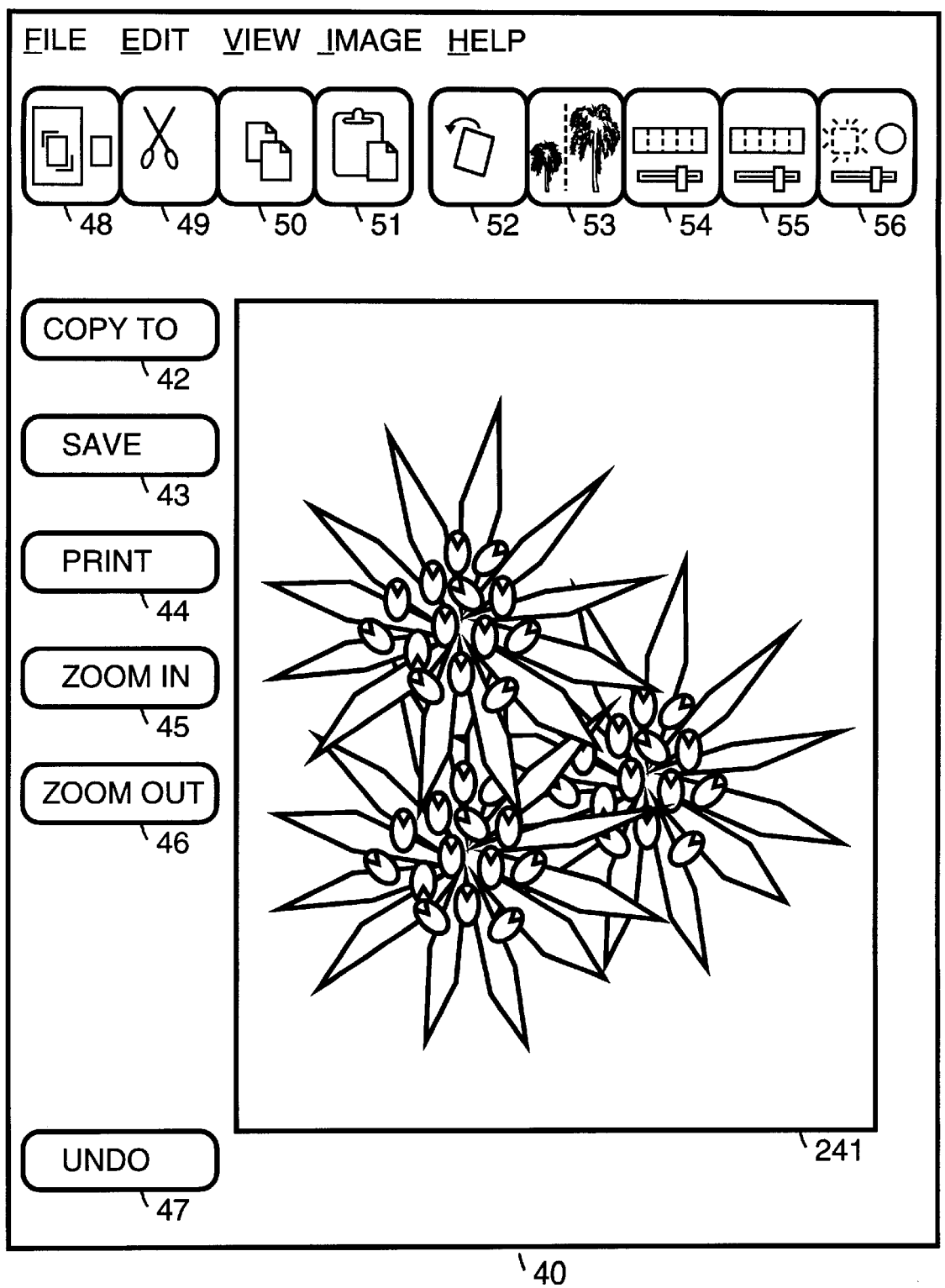
FIG. 6 shows the user interface to an image editor as shown in FIG. 3 with a modified displayed image in accordance with a preferred embodiment of the present invention.

For example, in FIG. 6, interface window 40 has been reopened and the new digitally represented image (with the new values for contrast and brightness) is displayed as a digitally represented image 241.

The present invention limits information loss which might result from otherwise making adjustments to modified adjustable image 143. In the absence of this feature, frequent changes to modified adjustable image 143 could result in significant information loss. An extreme example of this is if a user were to reduce the brightness to zero, and then try to increase it to its previous value. Because there is no information whatsoever in an image consisting of zero brightness pixels, the entire image information would be irretrievably lost.

In the preferred embodiment of the present invention, however, the modified adjustable image is always reset to a copy of the original (base) image before any sequence of adjustments are attempted (as illustrated by step 27). Also, the adjustments made in step 28 and step 29 are applied in the exact same sequence as in step 30 and step 31.

Additionally, because the exact same sequence of operations is always applied to a copy of the original image, any information loss caused by applying image modifying adjustments will always be the same as when applying the exact same sequence of adjustments to the original image. Also, the information losses will not be cumulative during any arbitrary trial sequences of user adjustments, since step 27 always starts with a fresh copy of the original image made during step 21.

Further, although the above describes an example of how to apply a sequence to two adjustments to an image, there is no restriction on how many independent adjustments may be made in the same manner.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computer implemented method for making adjustments to a represented image, the computer implemented method comprising the following steps:
    (a) copying a base image to produce a second image;
    (b) displaying the second image;
    (c) in response to a user adjusting a first adjustment control from a plurality of adjustment controls, performing the following substeps:
        (c.1) copying the base image to the second image,
        (c.2) varying the second image in accordance with current values for each of the plurality of adjustment controls, the current values for each of the plurality of adjustment controls being applied to the second image in accordance with a predetermined sequence, and
        (c.3) displaying the second image as varied in substep (c.2); and,
    (d) in response to the user adjusting a second adjustment control from the plurality of adjustment controls, performing the following substeps:
        (d.1) copying the base image to the second image,
        (d.2) varying the second image in accordance with current values for each of the plurality of adjustment controls, the current values for each of the plurality of adjustment controls being applied to the second image in accordance with the predetermined sequence, and
        (d.3) displaying the second image as varied in substep (d.2);
    wherein the predetermined sequence is independent of any sequence of adjustments made by the user.

2. A computer implemented method as in claim 1 wherein in step (c) the first adjustment control is a contrast control.

3. A computer implemented method as in claim 2 wherein in step (d) the second adjustment control is a brightness control.

4. A computer implemented method as in claim 1 additionally comprising the following step performed before step (a):
    (e) copying an original image to produce the base image.

5. A computer implemented method as in claim 4 additionally comprising the following step:
   (f) upon occurrence of an acceptance terminator, performing the following substeps:
      (f.1) varying the original image in accordance with current values for each of the plurality of adjustment controls, the current values for each of the plurality of adjustment controls being applied to the original image in accordance with the predetermined sequence, and
      (f.2) displaying the original image as varied in substep (f.1).

6. A computer implemented method as in claim 4 additionally comprising the following step:
   (f) upon the user indicating cancel, performing the following substeps:
      (f.1) displaying the original image.

7. A computer implemented method as in claim 1 additionally comprising the following step:
   (e) upon the user indicating revert, performing the following substeps:
      (e.1) copying the base image to the second image, and
      (e.2) resetting each of the plurality of adjustment controls to initial values.

8. Storage media for storing software, which when executed on a computing system, performs a method for making adjustments to a represented image, the method comprising the following steps:
   (a) copying a base image to produce a second image;
   (b) displaying the second image;
   (c) in response to a user adjusting a first adjustment control from a plurality of adjustment controls, performing the following substeps:
      (c.1) copying the base image to the second image,
      (c.2) varying the second image in accordance with current values for each of the plurality of adjustment controls, the current values for each of the plurality of adjustment controls being applied to the second image in accordance with a predetermined sequence, and
      (c.3) displaying the second image as varied in substep (c.2); and,
   (d) in response to the user adjusting a second adjustment control from the plurality of adjustment controls, performing the following substeps:
      (d.1) copying the base image to the second image,
      (d.2) varying the second image in accordance with current values for each of the plurality of adjustment controls, the current values for each of the plurality of adjustment controls being applied to the second image in accordance with the predetermined sequence, and
      (d.3) displaying the second image as varied in substep (d.2);
   wherein the predetermined sequence is independent of any sequence of adjustments made by the user.

9. Storage media as in claim 8 wherein in step (c) the first adjustment control is a contrast control.

10. Storage media as in claim 9 wherein in step (d) the second adjustment control is a brightness control.

11. Storage media as in claim 8 wherein the method additionally comprises the following step performed before step (a):
   (e) copying an original image to produce the base image.

12. Storage media as in claim 11 wherein the method additionally comprises the following step:
   (f) upon occurrence of an acceptance terminator, performing the following substeps:
      (f.1) varying the original image in accordance with current values for each of the plurality of adjustment controls, the current values for each of the plurality of adjustment controls being applied to the original image in accordance with the predetermined sequence, and
      (f.2) displaying the original image as varied in substep (f.1).

13. Storage media as in claim 11 wherein the method additionally comprises the following step:
   (f) upon the user indicating cancel, performing the following substeps:
      (f.1) displaying the original image.

14. Storage media as in claim 8 wherein the method additionally comprises the following step:
   (e) upon the user indicating revert, performing the following substeps:
      (e.1) copying the base image to the second image, and
      (e.2) resetting each of the plurality of adjustment controls to initial values.

15. An image editor comprising:
   initial copy means for copying a base image to produce a second image;
   displaying means for displaying the second image;
   a plurality of adjustment controls, including a first adjustment control and a second adjustment control; and,
   adjust means, coupled to the plurality of adjustment controls,
      for in response to a user adjusting the first adjustment control, copying the base image to the second image, varying the second image in accordance with current values for each of the plurality of adjustment controls, the current values for each of the plurality of adjustment controls being applied to the second image in accordance with a predetermined sequence, and causing the displaying means to display the second image as varied by the adjust means, and
      for in response to the user adjusting a second adjustment control from the plurality of adjustment controls, copying the base image to the second image, varying the second image in accordance with current values for each of the plurality of adjustment controls, the current values for each of the plurality of adjustment controls being applied to the second image in accordance with the predetermined sequence, and causing the displaying means to display the second image as varied by the adjust means;
   wherein the predetermined sequence is independent of any sequence of adjustments made by the user.

16. An image editor as in claim 15 wherein the first adjustment control is a contrast control and the second adjustment control is a brightness control.

17. An image editor as in claim 15 additionally wherein the initial copying means is also for copying an original image to produce the base image, the initial copying means copying the original image to produce the base image before copying the base image to produce the second image.

18. An image editor as in claim 17 additionally comprising:
   an acceptance control, wherein occurrence of an acceptance terminator, the acceptance control varies the original image in accordance with current values for each of the plurality of adjustment controls, the current values for each of the plurality of adjustment controls being applied to the original image in accordance with the predetermined sequence, and the displaying means displays the original image as varied by the acceptance control.

19. An image editor as in claim 17 additionally comprising:
a cancel control, wherein upon the user indicating cancel by selecting the cancel control, the display means displays the original image.

20. An image editor as in claim 15 additionally comprising;
a revert control, wherein upon the user selecting the revert control, the base image is copied to the second image, and each of the plurality of adjustment controls is set to an initial value.

21. A method of adjusting a base image, comprising the following steps:

(a) storing the base image for subsequent retrieval as an adjustable image;
(b) retrieving the adjustable image to facilitate base image adjustments;
(c) applying image adjustments to the adjustable image to preview a resulting changed image;
(d) displaying the resulting changed image; and,
(e) in response to a user changing a value of an image adjustment repeating steps (b), (c) and (d) without further user input.

22. A method as in claim 21 wherein in step (c) application of image adjustments is performed in a predetermined order, wherein the predetermined order is independent of any sequence in which the user changes values of image adjustments.

* * * * *